May 5, 1970

J. C. LARSON 3,510,179

JOURNAL BEARING SYSTEM

Filed Nov. 15, 1967

INVENTOR.
JOHN C. LARSON
BY
Brumbaugh, Free, Graves & Donohue
his ATTORNEYS

3,510,179
Patented May 5, 1970

---

3,510,179
JOURNAL BEARING SYSTEM
John C. Larson, Woodstock, N.Y., assignor to Rotron Incorporated, Woodstock, N.Y., a corporation of New York
Filed Nov. 15, 1967, Ser. No. 683,185
Int. Cl. F16c *17/16*
U.S. Cl. 308—114                                             1 Claim

---

ABSTRACT OF THE DISCLOSURE

A journal bearing system for mounting a member for rotation on a shaft comprising a bearing surface on the member, preferably constituted by a sleeve bearing affixed to the member, for journaling the member on the shaft and defining a bearing clearance with the shaft, a reservoir formed in the member for a semi-fluid thixotropic lubricant and in communication with the bearing clearance, and a thrust washer fixed on the shaft, the rotating member and the thrust washer having closely adjacent parallel opposed faces located in a plane substantially perpendicular to the axis of the shaft. The thrust washer has a plurality of helical pumping grooves formed in the said face and coacting with the opposed face of the rotatable member to pump lubricant inwardly. Passages in the rotatable member, preferably in the sleeve bearing, communicate a radically outward portion of the reservoir with the pumping grooves in the thrust washer. In operation the lubricant in the reservoir is forced outwardly by centrifugal force upon rotation of the rotatable member and is thereby pressurized to flow through the passages to the inlets of the pumping grooves, and the pumping grooves pump the lubricant under pressure to the bearing clearances.

---

BACKGROUND OF THE INVENTION

Figure 1:
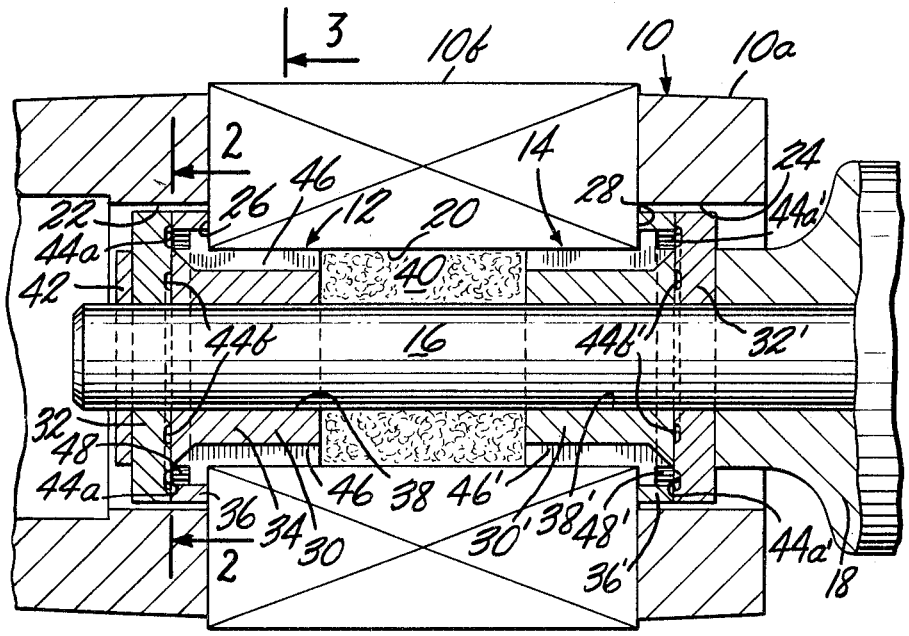

This invention relates to a novel and improved journal bearing system for mounting a member for rotation on a shaft and, more particularly, to a bearing system of the type embodying a sleeve bearing to which a lubricant is continuously circulated and provides substantially full pressure lubrication of the bearing clearance.

Often, the most critical parts of a moving mechanism are the bearings which serve to join one part to another for relative movement. This is particularly true of the journal bearings used to mount one member for rotation on another, the journal bearing often being the only part of the device that is subject to wear and failure and thus being the determining factor in the service life of the device. There have heretofore been many proposals for journal bearings, including ones providing for continuous circulation of lubricant to the bearing surface, thus to insure that lubricant is always present at the bearing surface. Although many types of the so-called self-lubricating bearings provide reasonably good results, they are often excessively costly and may be troubled by bearing noise and by a relatively short life. Moreover, many of the self-lubricating bearings embody complicated seals to retain lubricant, such seals often having rubbing surfaces which are subject to wear and failure, to say nothing of their frequent ineffectiveness to prevent lubricant loss that impairs the optimum operation of the lubrication system and leads to early failure.

SUMMARY OF THE INVENTION

There is provided, in accordance with the present invention, a novel and improved journal bearing system which is relatively inexpensive to manufacture, substantially trouble-free in operation, has a long life, and ensures retention of the lubricant with only relatively simple lubricant seals, in other words, eliminating the need for complicated seals.

More particularly, the journal bearing system of the invention provides for mounting a rotating member for rotation about a fixed shaft and comprises a bearing surface, which is preferably constituted by the bore of a sleeve bearing, on the member journaling the member on the shaft and defining with the shaft a bearing clearance which is supplied with a lubricant under pressure. The lubricant used in the bearing is a thixotropic grease which is contained in a reservoir formed in the member, the reservoir communicating with one part, preferably the end, of the bearing clearance.

A thrust washer is affixed on the shaft at a location adjacent the opposite end of the sleeve bearing (with respect to the end communicating with the reservoir) the thrust washer and sleeve bearing having closely adjacent, parallel, opposed faces located in a place substantially perpendicular to the axis of the shaft. That face of the fixed member has at least one, and preferably a plurality, of helical pumping grooves arranged to pump the lubricant inwardly and discharge it under pressure to the bearing clearance upon rotation of the rotatable member.

The grease in the reservoir is supplied to the inlet parts of the pumping grooves through one or more passages leading from the reservoir to the inlet portions of the pumping grooves, the rotation of the rotatable member about the shaft imposing centrifugal force on the lubricant in the reservoir and pressurizing it in the radially outward portion of the reservoir so that it is pumped through the passages to the inlet portions of the pumping grooves. To ensure that the bearing clearance is always supplied with lubricant, the resistance afforded by the passage to the flow of lubricant from the reservoir to the pumping grooves should be somewhat less than the resistance afforded by the bearing clearance to flow from the pumping grooves back to the reservoir. Thus, the bearing system provides for continuous circulation of lubricant from the reservoir, through the passages, inwardly through the pumping grooves to one end of the lubrication zone of the bearing, and through the lubrication zone back to the reservoir.

In one embodiment of the invention, the bearing surface on the rotating member is, as mentioned above, constituted by a sleeve bearing affixed to the rotatable member and having an inner bore journaling the member on the shaft and defining the bearing clearance. One end of the sleeve bearing forms one wall of the lubricant reservoir, and the passages for communicating the reservoir to the inlets of the pumping grooves are constituted by a plurality of circumferentially spaced-apart passages formed in the sleeve bearing. An annular groove communicating with these passages and with the inlets of the pumping grooves in the thrust washer serves as a header for the pumping grooves.

The bearing system may comprise two sleeve bearings and two thrust washers, each being formed with pumping grooves, the bearings being spaced-apart, the lubricant reservoir being located between them, and the thrust washers being located adjacent the outer ends of the bearings with respect to the reservoir. In this form of the bearing system, there are two separate circulation systems for the lubricant, one system for each bearing clearance. Each circulation system seals its end of the reservoir in the manner described below. On the other hand, when only a single bearing clearance and single circulating system is provided, a seal will generally be needed to close the end of the reservoir opposite from the bearing.

An important advantage of the bearing system of the invention is that it employs a thixotropic grease, that is a grease whose viscosity becomes less as the shear rate is increased. For one thing, this allows the bearing system to operate with relatively low drag. Moreover, the thixotropic characteristic is directional with the shear. Accordingly, at clearance openings, such as the clearance between the thrust washer and the portion of internal surface of the rotating member which is radially outward of the thrust washer, the viscosity of the grease is relatively low in the circumferential direction, thus minimizing drag, but very high in the axial direction, thus offering high resistance to leakage. To further minimize any leakage at this point, a suitable seal, such as that provided by grooving of the fixed member or the rotating member at the clearance space to cause back-pumping to the bearing, may be provided.

The shear-viscosity characteristic of the thixotropic grease also allows the hydrostatic pressure in the lubrication zone of the bearing to reach a relatively high value so that the grease provides greater support than that provided by an ordinary boundary layer lubrication film and indeed a support approaching full pressure lubrication. The thixotropic property of the grease, being directional with shear, also minimizes leakage through the bearing clearance in the axial direction. Thus, the bearing system of the invention embodies the advantages of lubrication of the bearing clearance at a relatively high hydrostatic pressure, under low rotational viscous drag, and high resistance to lubricant flow in the axial direction and consequently minimum leakage from the bearing.

Figure 2:
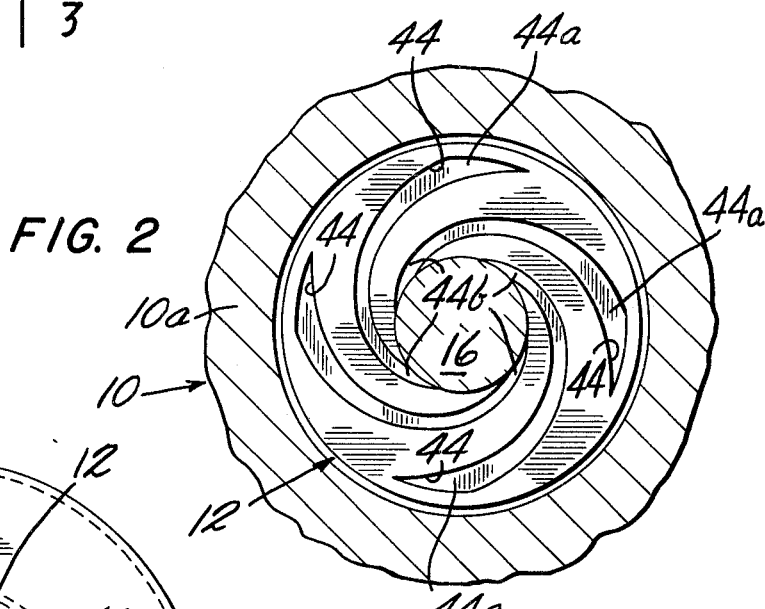
Figure 3:
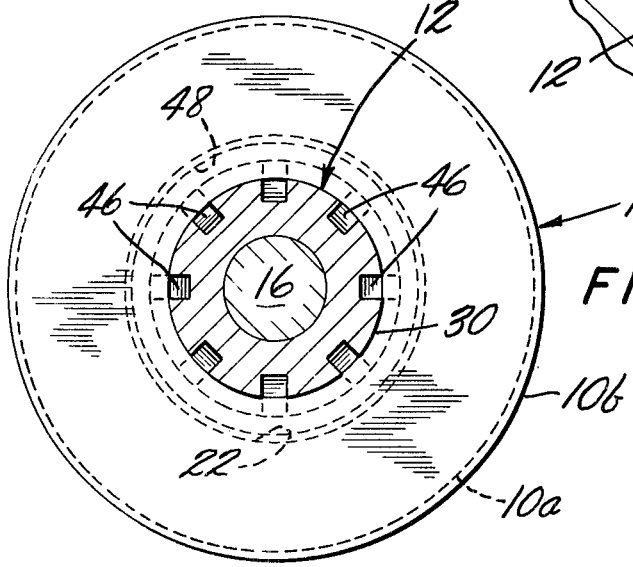

For a better understanding of the invention, and for further discussion of its advantages, reference may be made to the following description of an exemplary embodiment, taken in conjunction with the figures of the accompanying drawings, in which:

FIG. 1 is a cross-sectional view taken generally along an axial plane of one embodiment of the bearing system;

FIG. 2 is an end view in section taken generally along a plane through the interface of a sleeve bearing and a grooved thrust washer of the bearing system, as indicated generally by the lines 2—2 of FIG. 1, the view being on a larger scale than FIG. 1; and FIG. 3 is an end view in section of the bearing system of FIG. 1, the section being taken generally along a plane defined by the lines 3—3 of FIG. 1 and in the direction of the arrows.

DESCRIPTION OF EXEMPLARY EMBODIMENT

The embodiment of the invention shown in the drawings and described below exemplifies the bearing system as applied to an electric motor of the type in which a rotor, which is designated generally by the reference numeral 10, is mounted by means of sleeve bearings 12 and 14 for rotation about a fixed shaft 16, the shaft 16 being affixed to a boss or hub 18 forming a part of the motor housing. The motor stator (not shown) surrounds the rotor 10. The rotor is composed of a body 10a and a core 10b, shown schematically, the core 10b having a central cylindrical opening 20 of a diameter less than cylindrical bores 22 and 24 on the body, thereby to provide outwardly facing shoulders 26 and 28.

The bearings 12 and 14 by which the rotor 10 is journaled on the shaft 16 are substantially identical except in one respect that is described below, and therefore the same reference numerals are used to designate the elements making up each bearing 12 or 14, but with a prime suffix added to designate the elements of the right bearing 14.

Each bearing system 12 (or 14) is composed of a sleeve bearing 30 which is affixed to the rotor 10 and a thrust washer 32 which is affixed to the shaft 16. The sleeve bearing 30 includes a cylindrical body 34 and an outwardly extending flange 36 at one end which presents an inwardly facing shoulder abutting the shoulder 26 (or 28) provided by the rotor core 20. The sleeve bearing is suitably affixed to the rotor 10, such as by means of a press fit between the outer diameter of the body 34 and the internal diameter of the opening 20 in the rotor core 10b. The sleeve bearing has an internal bore 38 constituting a bearing surface that has a suitable fit with the shaft 16 to provide a bearing clearance for journaling the rotor on the shaft.

The axial dimensions of the respective bearing sleeves 30 and 30' are, relative to the axial dimension of the rotor core 10b, such that the inner ends are spaced-apart, thereby leaving a cavity or reservoir 40 bounded by the outer surface of the shaft 16, the wall of the opening 20 of the rotor core 10b and the inwardly facing ends of the sleeve bearings 30 and 30'. At the assembly of the bearing system, the reservoir 40 is filled with a thixotropic grease, a suitable grease being commercially available under the designation "McLube 1191" (McGee Chemicals Company, Inc., Upper Darby Pa.). The thixotropic grease used with the bearing system of the invention should have a maximum thixotropic physical characteristic, minimum solids for thickening agents, a satisfactorily high melt point, and semi-fluid properties at the lowest temperatures to be encountered in operation.

The outwardly facing surfaces of the sleeve bearings 30 and 30', which are located in planes perpendicular to the axis of the shaft 16, are in bearing clearance with the inwardly facing surfaces of the thrust washers 32 and 32' respectively. As mentioned above the thrust washers 32 and 32' are affixed to the shaft 16 such as by being press fitted on the shaft or by appropriate keys. The thrust washer 32 located at the end of the shaft 16 (to the left of FIG. 1) is backed up and held in axial position by a lock ring 42, while the thrust washer 32' on the inner end of the shaft (to the right in FIG. 1) abuts the outer end of the boss 18.

The inwardly facing surfaces of the thrust washers 32 and 32' are formed with a plurality of helical pumping grooves 44. As best shown in FIG. 2, the pumping grooves 44 have inlet portions 44a spaced slightly inwardly from the outer perimeter of the thrust washer and have discharge portions terminating at the inner bores. It will be understood, of course, that the direction of the helices 44 at the pumping grooves on the respective thrust washers 32 and 32' will be reversed, relative to each other, i.e., in the same direction relative to the direction of rotation of the rotor 10, so that the grooves on both thrust washers will operate to pump lubricant inwardly from the inlet portions 44a to the discharge portions 44b upon rotation of the rotor.

The grease contained in the reservoir 40 is supplied to the pumping grooves through a plurality of circumferentially spaced-apart, axially extending passages 46 formed on the sleeve bearing 30. As best seen in FIG. 3, the passages 46 are in the form of grooves having a generally rectilinear cross-sectional shape, but any suitable form of passage can be used. The outward ends of the passages 44, with respect to the reservoir 40, communicate with an annular, inwardly extending groove 48 formed in the outward face of the sleeve bearing 30, the groove 48 serving as a header for the pumping grooves 44 and thus being positioned so as to generally overlie the inlet portions 44a of the grooves 44.

The bearing system operates in the following manner. Upon rotation of the rotor 10 about the shaft 16, the grease in the reservoir 40 is forced outwardly by centrifugal force toward the inwardly facing surface of the opening 20 of the rotor core element 10b, which forms the outer wall of the reservoir, thereby creating a hydrostatic pressure in the grease. Because the grease is a semifluid, the pressure is imparted in the axial direction and accordingly causes the grease to flow outwardly through the passages 46 and the header groove 48 to the inlet portions 44a of the pumping grooves in the thrust washer 32. The rotation of the sleeve bearing 30 relative to the washer 32 pumps the grease inwardly along the pumping grooves from which it is delivered to the bearing clearance. The inward pumping creates a hydrostatic pressure of a comparatively high magnitude in the bearing clearance and provides a greater lubricant support film than does the ordinary boundary layer lubrication applicable in most conventional bearings. Because of the differential pressure between the outward end and inward end of the bearing clearance space, there is some end leakage from the bearing clearance back into the reservoir, but any grease that returns to the reservoir 40 is recycled by the normal operation of the bearing as described above. The desired gradual circulation of grease across the bearing surfaces by pressure differential may be further induced by very fine pumping grooves (not shown) formed in the bores 38 of the sleeves 30 or on the shaft 16.

To ensure that the bearing clearance always contains an adequate supply of grease, the resistance to the flow of the grease through the passages 46 should be substantially less than the resistance afforded by the bearing clearance. With these flow conditions the grease will always be supplied under pressure by the pumping grooves to the bearing clearance.

The embodiment of the bearing system illustrated in the drawings also inherently operates to center the rotor relative to the thrust washers 32 and 32' by virtue of the tendency for a displacement of the rotor 10 toward one or the other of the thrust washers to create a higher hydrostatic pressure in the clearance space between the abutting faces of the washer and sleeve bearing.

The use in the bearing system of the invention of a grease having a thixotropic physical characteristic is believed to be an important element of the system. For one thing, the thixotropic physical property of the grease, that is, the reduction of viscosity with shear, enables the bearing to operate with relatively low drag. Also, the capability of the hydrostatic pressure in the bearing clearance attaining a relatively high value is a result of this property, and especially the directional aspect of the property. The directionality of the thixotropic property, moreover, enables the ssytem to operate with minimum loss of grease, thereby enhancing the service life of the bearing without replenishment of the grease. The possibility of leakage occurring by axial flow (non-directional with the shear) between the outside diameter of the thrush washer and the internal diameter of the rotor body 10a at the bore 22 may be further reduced by grooving on either the thrust plate or rotor body to cause an inward pumping action.

In the particular embodiment illustrated in the drawings, which is characterized by the provision of two bearing systems 12 and 14, each of which has an independently operating lubricant circulation system, each bearing system 12 or 14 in effect constitutes an end seal for the reservoir that serves the other. Accordingly, the illustrated embodiment does not require any seals. It will be apparent, however, that the bearing system of the invention can be adapted for use with a single sleeve bearing and coacting thrust washer by providing a suitable setal to close the end of the lubricant reservoir opposite the bearing. The operation of a conventional type of bearing seal will be significantly enhanced because of the use of a thixotropic grease as the bearing lubricant. As mentioned above, the viscosity of the lubricant grease is directional with the shear, thereby providing a minimal rotational drag in the seal but at the same time providing high viscosity and maximum resistance to leakage in any direction.

I claim:
1. A journal bearing system comprising a shaft, a rotatable member, first and second spaced-apart sleeve bearings fixed on the rotatable member and having inner bores constituting bearing surfaces journaling the rotatable member on the shaft and defining spaced-apart bearing clearances with the shaft, means defining a reservoir in the rotatable member in the region between the sleeve bearings, a semi-fluid thixotropic, grease-type lubricant in the reservoir, the reservoir having an inner zone communicating with the inner ends, with respect to each other, of the bearing clearances, first and second thrust washers fixed on the shaft adjacent the outer ends, with respect to each other, of the sleeve bearings, the thrust washers and sleeve bearings having, respectively, closely adjacent parallel opposed faces located in planes substantially perpendicular to the axis of the shaft and each thrust washer having at least one pumping groove formed in the said face thereof and coacting with the adjacent opposed face of the respective sleeve bearing to pump lubricant through the pumping groove upon rotation of the rotatable member, each pumping groove having a discharge portion at a radially inward part thereof with respect to the shaft for discharging the lubricant to the bearing clearance and having an inlet portion radially outward of the discharge portion, and means in the member communicating a zone of the reservoir radially outwardly of the said inner zone with the inlet portions of the respective pumping grooves, whereby the lubricant is forced outwardly in the reservoir by centrifugal force upon rotation of the rotatable member and is thereby pressurized to flow outwardly through the communicating means to the inlets of the pumping grooves in the respective thrust washers and is then pumped inwardly under pressure to the respective bearing clearances.

References Cited

UNITED STATES PATENTS

| | | | |
|---|---|---|---|
| 1,568,779 | 1/1926 | Sparks | 308—109 |
| 1,105,033 | 7/1914 | McCarter | 308—107 |
| 1,747,744 | 2/1930 | Venable | 308—113 |

FOREIGN PATENTS

| | | |
|---|---|---|
| 664,353 | 8/1938 | Germany. |

OTHER REFERENCES

Manufacture and Application of Lubricating Greases by C. S. Bones. Published 1954, pp. 55, 66 and 67 relied upon.

MARTIN P. SCHWADRON, Primary Examiner

F. SUSKO, Assistant Examiner